No. 795,564. PATENTED JULY 25, 1905.
H. H. TURNER.
CONNECTION FOR WASTE PIPES.
APPLICATION FILED JUNE 22, 1904.

WITNESSES
Lucy Koch
R. M. Calfee

INVENTOR
Henry H. Turner
By Fouts & Hull
ATTORNEYS

UNITED STATES PATENT OFFICE.

HENRY H. TURNER, OF ROCHESTER, NEW YORK.

CONNECTION FOR WASTE-PIPES.

No. 795,564.           Specification of Letters Patent.           Patented July 25, 1905.

Application filed June 22, 1904. Serial No. 213,609.

*To all whom it may concern:*

Be it known that I, HENRY H. TURNER, residing at Rochester, in the county of Monroe and State of New York, have invented a certain new and useful Improvement in Connections for Waste-Pipes, of which the following is a full, clear, and exact description, reference being had to the accompanying drawings.

My invention relates to connections for waste or vent pipes, and more particularly to pipes leading below the floor from bath-tubs and wash-bowls to the lead bends of closets, and has for its object the provision of means whereby lead pipes may be dispensed with and the same may be substituted by ordinary galvanized pipe of standard size. The usual method employed for making such connections has been to make a small opening in the lead bend and to enlarge the same by flanging out and then inserting within said opening the end of the lead pipe, after which a joint is wiped on said pipe. By this construction it is necessary to use lead pipes in bath-tubs and bowls in all bath-rooms. By my invention I have been able to dispense with the use of such pipes and to employ instead ordinary galvanized pipe of standard size.

Figure 1:
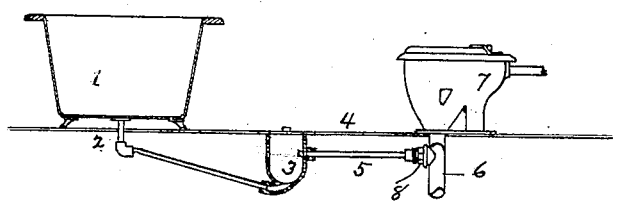
Figure 2:
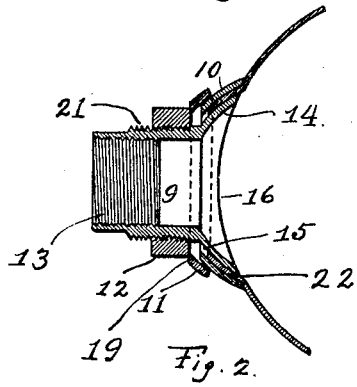
Figure 3:
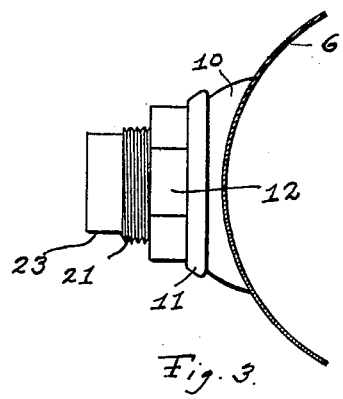
Figures 4, 5:
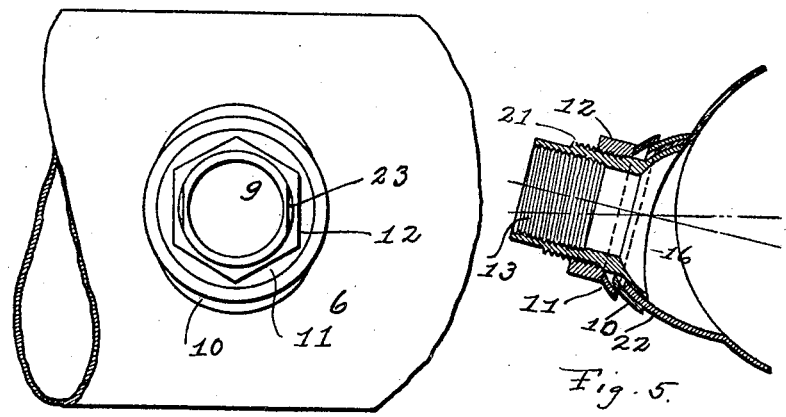

Referring to the drawings, Figure 1 represents an elevation showing one manner of applying my invention to the waste-pipe of a bath-tub. Fig. 2 represents an enlarged sectional view showing the connection which I employ applied to the lead bend leading from the closet. Fig. 3 represents a plan view of my connection, the lead pipe to which it is applied being shown in section. Fig. 4 represents an end view of my connection, showing same applied to the lead bend. Fig. 5 represents a view similar to Fig. 2, showing the manner in which my connection may be applied to the bend at varying angles therewith.

Describing the parts by numerals, 1 represents a bath-tub having connected therewith a waste-pipe 2. This waste-pipe may, if desired, be connected with a trap 3, located below the floor 4 of the room in which said tub is situated. Leading from the upper portion of said trap is the pipe 5, said pipe being connected with the lead bend 6 of the closet 7 by means of my connection 8. While I have shown a trap interposed between the bath-tub and the lead bend, so far as the purposes of my invention are concerned it is immaterial whether said trap be present or not.

As will appear more particularly from inspection of Figs. 2 to 5, inclusive, the connection consists generally of four parts—an interiorly and exteriorly threaded member 9, an inner washer 10, an outer washer or clamp 11, and the clamping-nut 12, said nut having an interior threaded portion engaging the exterior thread of the member 9. The member 9 is throughout the greater part of its length of uniform diameter and is provided near one end thereof with the internal thread 13. The diameter of this portion of member 9 is such as to receive the threaded end of the pipe 5, said pipe being of ordinary galvanized iron of standard size—say one and one-fourth inches in diameter. The opposite or inner end of the member 9 is flanged outwardly, as at 14, to present a round external surface 15. As the lead bend is cylindrical in form, I make this flange spherocylindrical in shape—*i. e.*, the said flange is of spherical curvature, but is cut away at the inner end of the same as if a cylindrical surface had been passed through such inner end at substantially right angles to the longitudinal axis of the member 9. The cut-out portion 16 thus formed corresponds in curvature to the cylindrical lead bend and permits the flange to be fitted within the bend without obstructing the flow through the same. Complementary to the flange 14 is the washer 10, which is also spherocylindrical in shape to receive between itself and the flange the gasket formed from the surplus material 22 of the bend and to conform to the cylindrical contour of said bend. Exterior to the member 10 is the clamp or washer 11, said clamp or washer having a spherical exterior and interior surface corresponding to the surface of the member 10 adjacent thereto and having at its outer extremity a vertical bearing-surface 19 of considerable extent, said surface being formed by cutting the spherical washer at right angles to the direction of its axis. Externally arranged with respect to the member 11 is the nut 12, said nut being of the ordinary type and having an internal thread fitting the external thread 21 of the member 9.

From the above description the mode of application of my connection will be readily understood. Ordinarily when the bath-room fittings are being installed a hole of sufficient size, somewhat smaller than the flange 14, will be cut in the lead bend and the member 9 will be inserted within said bend, the outer portion being pushed through the hole in the same from the inside. The surplus material 22 of the lead bend will be shaped around the outer surface 15 of the flange 14. The members 10, 11, and 12 will then be slipped over the member 9 from the outside, and by setting up on the nut 12 the part 11 will be forced against the portion 22 of the lead bend, which, being clamped tightly between said portion 11 and the flange 14, will serve as a gasket to prevent leakage from the orifice that has been formed in the bend. During this operation the flange 14, washers 10 and 11, and nut 12 act as a drawing-tool, drawing out the metal of the lead bend into the shape shown in the drawings to form a packing between said flange and the washer 10 and embedding said flange in said bend. When the flange is so embedded, the vertical cylindrical contour of said flange and washer 10 prevent the connection from offering any obstruction to the flow through the bend, either by the projection of the flange beyond the inner surface of the bend or by the forcing inwardly of a portion of said bend by the washer. After this the pipe 5 may be readily applied to the member 9 by securing the threaded end of same in the threaded portion 13 of the said member. To prevent displacement of the member 9, the outer extremity thereof may be provided with flattened portions 23, permitting the application of a wrench thereto to prevent twisting of the connection when the pipe is being threaded into same.

By constructing members 14, 11, and 12 with a spherical contour I provide, in effect, a universal joint, whereby my connection may be applied to the lead bend at an angle varying from a right angle. By this means the pipe 5 may be so led as to avoid obstruction and yet permit the application of the connection to the lead bend without difficulty. In Fig. 5 I have shown the parts in the positions which they will occupy when the pipe leads to the bend at an angle other than a right angle. In making this connection the advantage of the washer 11, with its bearing-surface 19, is marked. One of the elongated ends of the washer 10 will engage the outer surface of the lead bend before the other, owing to the angle at which the connection 9 is inserted into said bend. With the nut applied directly to said washer it would engage only the small adjacent portion of said washer. The washer 11, however, owing to its inner spherical contour serves as an equalizer to permit complete engagement with its surface 19 by the nut 12 and to transmit the strain produced by tightening the nut to the entire washer 10. As the nut is further tightened the washer 11 adjusts itself to the surface of the washer 10 until both said washers are finally parallel or concentric with the flange 14.

It will be apparent from the above description that I have produced a simple and efficient connection whereby the expensive mode of connecting tubs and wash-bowls with lead bends of closets may be dispensed with and which, owing to its features of construction, will permit of a wide range of adaptability to the tubs and closets already installed, as well as to those which are being installed for the first time in houses.

While I have described my invention in detail, it will be obvious that such details may be departed from more or less without avoiding the spirit of my invention, and I do not propose to be limited to such details except as the same may be included in the claims hereto annexed or rendered necessary by the prior state of the art.

Having described my invention, I claim—

1. A connection for use with the lead bends of closets and the like, said connection consisting of a tubular member having at one end thereof a flange of rounded contour and at the other end a threaded portion adapted to receive a pipe of standard size, a rounded washer exterior to said flange and adapted to clamp between itself and said flange a portion of the lead bend, a rounded clamp or washer external to said last-mentioned washer or member, and a nut threaded on said tubular member and adapted to force both of said washers toward the flange to clamp the same to the lead bend, substantially as described.

2. A connection for use with lead bends of closets and the like, said connection consisting of a tubular member having at one end thereof a rounded flange adapted to be placed within the bend with its outer surface in engagement with the interior thereof and having at its opposite end a threaded portion to receive a pipe of standard size, a rounded washer or member exterior to said flange and adapted to clamp between itself and said flange a portion of said bend, a rounded clamp or washer exterior to the last-mentioned washer and adapted to engage the same, said last-mentioned washer having at its outer end an extended bearing-surface, and a nut threaded on said tubular member and adapted to engage the bearing-surface of said last-mentioned washer to force both of the washers toward the flange on the tubular member, substantially as described.

3. A connection for use with lead bends of closets and the like, said connection consisting of a tubular member having at one end thereof a rounded flange adapted to be placed within the bend with its outer surface in engagement with the interior thereof, said flange being concaved to correspond to the contour of the bend, said member having at its opposite end a portion threaded to receive a pipe of standard size, a rounded washer or member exterior to said flange and adapted to clamp between itself and said flange a portion of said bend, a rounded clamp or washer exterior to the last-mentioned washer and adapted to engage the same, said last-mentioned washer having at its outer end an extended bearing-surface, and a nut threaded on said tubular member and adapted to engage the bearing-surface of said last-mentioned washer to force both of the washers toward the flange on the tubular member, substantially as described.

4. A connection for use with lead bends for closets and the like, said connection consisting of a tubular member having at one end thereof a spherocylindrical flange adapted to be placed within the bend with its surface in engagement with the interior of said bend, said member having its opposite end constructed for connection with a pipe, a spherocylindrical washer exterior to said flange and adapted to clamp between itself and said flange a portion of said bend, a rounded clamp or washer exterior to the last-mentioned washer and adapted to engage the same, and a nut threaded on said tubular member exterior to the last-mentioned washer and adapted to engage the same to force both of the washers toward the flange on the tubular member.

5. A connection for use with lead bends of closets and the like, said connection consisting of a tubular member having at one end thereof a spherocylindrical flange adapted to be placed within the bend with its outer surface in engagement with the interior thereof, said member having its opposite end constructed to receive a pipe of standard size, a spherocylindrical washer exterior to said flange and adapted to clamp between itself and said flange a portion of said bend, and a nut threaded on said tubular member and adapted to force said washer toward the flange on the tubular member, substantially as described.

In testimony whereof I affix my signature in the presence of two witnesses.

HENRY H. TURNER.

Witnesses:
HARRY M. R. GLOVER,
A. M. BELL.